May 16, 1944.  H. J. FINDLEY  2,349,084
ADJUSTABLE BEARING MOUNTING
Filed May 1, 1942   2 Sheets-Sheet 1
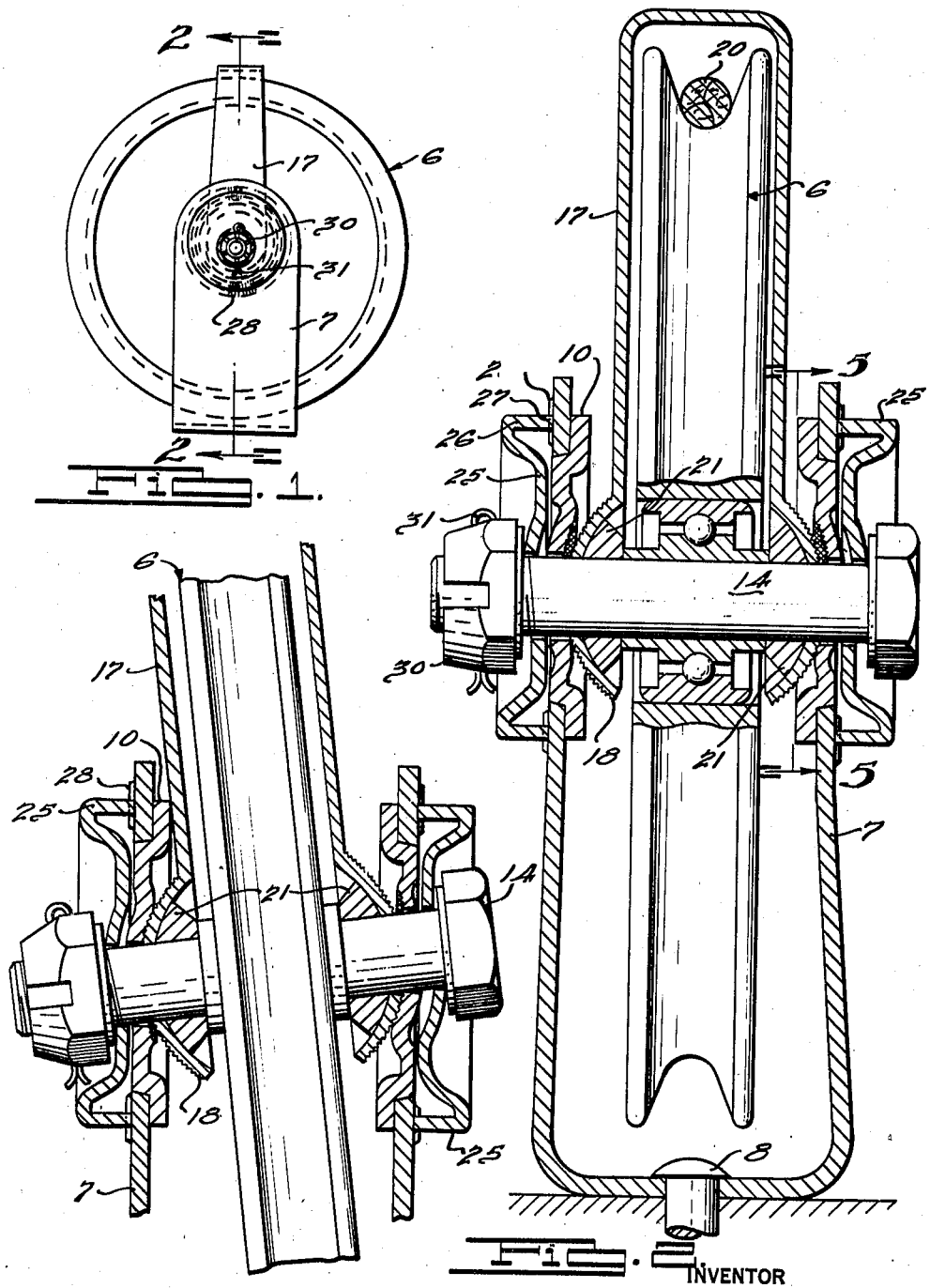
INVENTOR
Howard J. Findley.
BY John Zittark
ATTORNEY May 16, 1944.  H. J. FINDLEY  2,349,084
ADJUSTABLE BEARING MOUNTING
Filed May 1, 1942  2 Sheets-Sheet 2
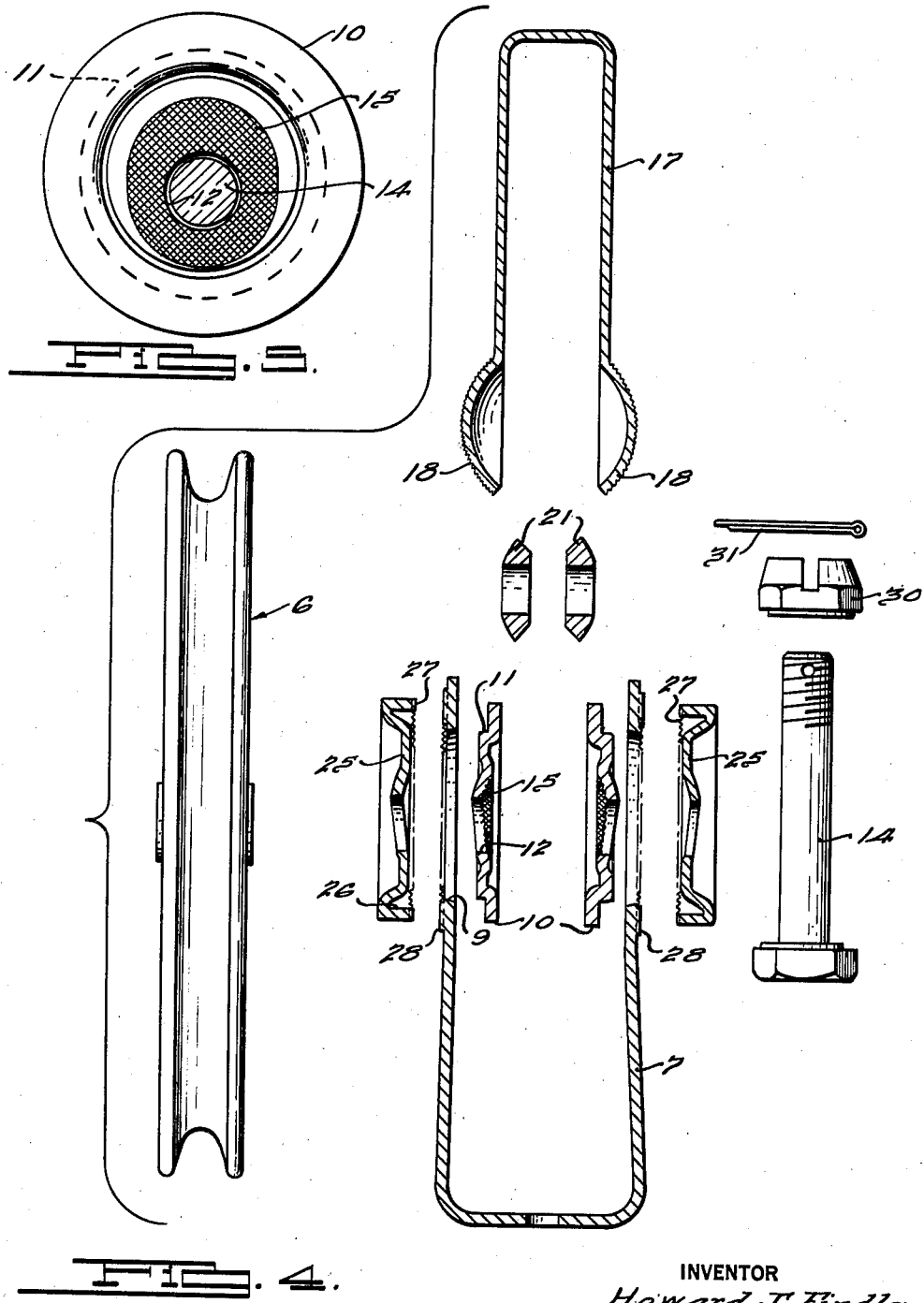

Patented May 16, 1944

2,349,084

UNITED STATES PATENT OFFICE 2,349,084

ADJUSTABLE BEARING MOUNTING

Howard J. Findley, Shaker Heights, Ohio, assignor to Eaton Manufacturing Company, Cleveland, Ohio, a corporation of Ohio Application May 1, 1942, Serial No. 441,268

6 Claims. (Cl. 308—61)

This invention concerns pulley mountings and especially pulley mountings adjustable to correct alignment with a cable trained thereover.

The principal object of the present invention is the provision of an adjustable mounting for pulleys which accommodates movement of the body thereof about its axis in longitudinal, lateral and inclined or transverse positions to an axis of rotation which is eccentrically disposed with respect to the true geometrical center of the mounting bracket; the provision in a pulley construction, as described, of a simplified compact structure including substantially positive locking means for fixing the pulley in adjusted position.

Among the objects of the present invention is the provision of an adjustable mount for pulleys including a plurality of parts provided with suitable serrated or knurled portions thereof for mating with adjacent and complementary shaped surfaces of other parts to resist any inadvertent movement thereof from adjusted position; the provision in a pulley construction as just described of an adjustable guide member bridging the periphery of the pulley wheel and which is arranged for locking engagement in adjusted position with the adjustable mounting means whereby eccentric movement in straight or inclined positions of the pulley axle is accommodated in its mounting bracket by a novel elongated generally hemispherical concave seat portion in an eccentrically perforated bearing which journals the pulley axle without effecting distortion or springing of the mounting bracket arms.

Further and other objects and advantages of the invention reside in the novel combination and arrangement of parts about to be described, when considered in conjunction with the drawings forming a part of this specification, and are more particularly pointed out in the appended claims.

In the drawings which illustrate the genus of the invention like reference characters denote corresponding parts throughout the several views, and in which:

Fig. 1 is a side-elevational view of the pulley and mounting of the present invention; and Fig. 2 is a vertical sectional view, with some parts in elevation, taken substantially on the line 2—2 of Fig. 1; and Fig. 3 is a similar view showing the pulley tilted on its axis by adjustment of the eccentrically perforated bearings on the mounting bracket; and Fig. 4 is an exploded view illustrating all the mounting members in approximately correct order; and Fig. 5 is an elevational view showing in detail one of the inside bearings illustrating its elongated, generally hemispherical, concave seat with knurled facing and taken substantially on the line 5—5 of Fig. 2.

In the practical application of pulleys, various problems have arisen making it desirable to have some adjustment movement built in the mounting means or brackets thereof to accommodate misalignment of the grooved periphery of the pulley wheel with a cable, rod, or other part trained thereover. This has been accomplished in some instances by adjustable mountings which afforded vertical or longitudinal movement and other means separate or combined therewith that provided horizontal or lateral movement of the pulley body, but, insofar as applicant is aware, no single mounting heretofore has incorporated three dimensional movement in a unitary structure regulating the axle bearing of the pulley and including means for locking the same in any selected angular or eccentric position with respect to the geometrical center of the mounting bracket.

Now having reference to the drawings and particularly Figs. 1 to 3, there is shown a ball-bearing mounted grooved pulley generally designated 6, which is supported in a U-shaped bracket 7, that may be secured to a mounting body by any suitable fastening means 8. The bracket shown is merely illustrative of one form of pulley mounting and obviously other forms of brackets may be employed which may be disposed at various angles with respect to its base as conditions of installation and service dictate. The bracket 7 has a circular tapered opening 9 in each of the spaced upstanding arms thereof for reception of annular bearings 10, each of which has a concentric tapered flange 11 thereon to be pressed in the complementary tapered openings 9 for snugly mounting the same. Within the bearing 10 is an aperture 12 which is eccentrically disposed with respect to concentric flange 11 to provide a predetermined eccentricity of movement for axle shaft 14 to be passed therethrough. A generally dished or hemispherical seat 15 having unequal horizontal and vertical meridians or radii surround the aperture 12 and has a diamond-shaped or criss-crossed knurled surface on the concave seat face 15 thereof, all as best shown in the elevational detail view of Fig. 5, and all for a purpose to be later described. A U-shaped guide member 17 bridges the outer periphery of the grooved pulley 6 and has a pair of bifurcated arms with generally hemispherical portions 18 adjacent the outer ends thereof with convex faces presented to each of the concave seats 15 of the bearings 10. Similar diamond-shaped or criss-crossed knurled surfaces are coined in the convex seat faces 18 for locking engagement with the knurled surfaces on the concave seat faces 15 when the parts are located in adjusted position. It will be understood the guide member 17 is provided to keep the cable or rod 20 trained over the grooved pulley wheel from leaving the groove. Within the concave portions of each of the outwardly dished or convex seats 18, of the guide 17, are a pair of axially spaced spherically truncated and apertured washer members 21 which keep the arms of the guide member 17 spaced from the opposite faces of the pulley 6, and serve to provide a solid assembly for the several members axially spaced along the axle shaft 14 in nested relation.

As shown in Figs. 2 and 3 a second set of outer annular bearings 25 are disposed axially outward of the mounting bracket 7 and have apertured dished seat portions eccentrically disposed with respect to their outer periphery for nesting in complementary relation with the convex seat portions 15 of the inner bearing washers 10. An axially extended flanged portion 26 of the outer periphery of these bearing members 25 has radially disposed serrations, or saw like teeth 27 for meshing with radially disposed and elongated serrations 28 on the bracket 7 surrounding the tapered opening 9 in the arms thereof. The axle shaft 14 has a headed portion at one end thereof, which bears against the convex seat portion of one of the outer bearings 25, and the other end of the axle shaft is threaded and pierced for reception of a castellated nut 30 and cotter key 31 to securely lock the hub assembly in adjusted position.

The function and operation of the parts thus far described is as follows: when it is desired to adjust the pulley wheel 6 to bring it into alignment with the run of the cable 20 trained thereover the cotter key is removed from the castellated nut which may then be loosened and the outer bearing 25 backed away from the meshed serrations 27 and 28. The mechanic may then grasp the flanges 26 of each of these outer bearings or employ a suitable spanner tool thereon, and rotate the bearings 25 together in unison a like angular amount to secure raising, lowering or forward and backward movement of the pulley wheel, in the plane of its body, with respect to the mounting bracket 7. By holding one bearing while rotating the axially opposite bearing a desired angular inclination of the pulley wheel may be secured, as shown in Fig. 3; or by rotating one bearing 25 more or less than the other bearing any other desired angular inclination may be secured with respect to the mounting bracket 7. It will be apparent that such movement and adjustment setting may be produced by reason of the eccentrically disposed axle shaft apertures through the inner and outer bearings 10 and 25, which give a desired degree of movement within the range of eccentricity selected. By reason of moving the axle shaft 14 bodily with the pulley wheel and ball-bearing mounting no angularity of the bearing or the axle shaft in the pulley wheel is occasioned, and, due to the knurled faced seatings 18 and 15 and serrated portions 27 and 28, once the adjustment is made a substantial lock is assured.

The elongated seat or knurled facing 15, previously mentioned which meshes with the knurled facing 18 is necessitated in view of the eccentrically disposed apertures in the bearings 10, because as the pulley is angularly adjusted the guide member 17, having the concentric apertures and the knurled seat facing 18, rotates with the pulley wheel and the complementary knurled-face seating portion 15, on the inner bearing 10 rotates on a different radius governed by the eccentricity incorporated therein, and if it was not for this elongated seat facing 15, the arms of the mounting bracket 7 would be sprung outward. Consequently in any one position of adjustment the mated seat portions 15 and 18 bear at diagonally or diametrically opposite portions of the generally spherical hub portion, as shown in Figs. 2 and 3, and for any other adjustment setting bear at different portions.

An important fact concerning the several component members of the pulley mounting is that they may all be formed from stampings of substantially standardized size to fit a variety of different size pulley wheels, provided, of course, the selected eccentricity will produce the desired range of adjustment movement. The knurled surfaces may be readily coined or pressed into the appropriate members at the desired portions thereof as will be understood by those skilled in this art. The pulley wheel itself may be a conventional macerated phenol plastic product of selected diameter with a well known ball-bearing hub pressed therein, or, selectively, it may be a grooved metal wheel dependent upon the service to which it may be put.

It will be apparent this adjustable mounting means is not confined to pulley wheels exclusively but may be used with equal facility for mounting gears, shafting, or other parts where an adjustable bearing having a movement such as described is desired.

From the foregoing disclosures it will be apparent there has been disclosed a novel adjustable bearing mount which incorporates, among other things, the objects and advantages of the invention first enumerated. It is not intended to be limited however to the specific example of a pulley mounting shown, which is merely illustrative of the genus of the invention, as many variations will now be suggested to those skilled in the art to which it is related and the spirit of the broad invention is commensurable with scope and substance of the following claims.

What I claim is:

1. In an adjustable bearing for a non-rotatable shaft which mounts a part rotatable thereon, a base having spaced upstanding arms with tapered apertures therethrough, apertured bearings overlying the axially outer edges of the apertured arms of said base, a second set of apertured bearings having tapered flanges receivable in the axially inner edges of the tapered apertures of the arms of said base, eccentrically disposed apertures through each of said outer and inner bearings in line with the apertures in said base arms, and said shaft journalled in the eccentrically disposed apertures of said bearings and the apertures of said base arms and secured against rotation therein, whereby upon release of said non-rotatable shaft the eccentrically apertured bearings journalling the same may be rotated to displace the shaft and rotatable part thereon within the range of eccentricity provided.

2. An adjustable mounting for a wheel rotatably mounted on a non-rotatable axle shaft comprising in combination; a bracket having spaced upright arms with tapered apertures therein, bearings disposed respectively upon axially outer and inner sides of the tapered apertures in said bracket, said inner bearings having tapered flange portions receivable in the complementary apertures of said bracket, said outer bearings having means co-operable with other means surrounding the apertured bracket arms to prevent rotation relative thereto, eccentrically disposed apertures through said outer and inner bearings surrounded by concavo-convex dished seat portions, respectively, a shaft extended through said apertured bracket and bearings and having opposite ends pressed to the outer bearing members to hold the parts in assembled adjusted relation, and said bearing members being manually adjustable upon releasing said non-rotatable shaft to eccentrically displace the axis of the wheel.

3. An adjustable mounting for a pulley wheel rotatably mounted on a non-rotatable shaft comprising in combination; a mounting bracket having spaced upright arms with tapered apertures therein, bearings disposed respectively upon axially outer and inner sides of the tapered apertures in said mounting bracket, said inner bearings having tapered flange portions receivable in the complementary apertures of said mounting bracket, said outer bearings having means co-operable with other means surrounding the apertured mounting bracket arms to prevent rotation relative thereto, eccentrically disposed apertures through said outer and inner bearings surrounded by concavo-convex dished seat portions, respectively, a shaft extended through said apertured mounting bracket and bearing members and having opposite ends pressed to the outer bearing members to hold the parts in assembled adjusted relation, and each pair of said inner and outer bearings being separately manually adjustable upon releasing said non-rotatable shaft to eccentrically displace either end of said shaft about the eccentrically apertured dished seat portions of said bearings to thereby bodily displace the axis of the pulley mounted thereon from a plane passed through the pulley wheel.

4. An adjustable pulley mounting comprising in combination; a mounting bracket having spaced upright arms with openings therethrough, bearings disposed respectively upon axially outer and inner sides of the openings in said mounting bracket, eccentrically disposed openings through said bearings surrounded by concavo-convex dished seat portions, a non-rotatable axle shaft journalled in said bearings and rotatably mounting a pulley wheel thereon, a U-shaped guide member bridging a portion of the periphery of the pulley wheel and having openings surrounded by concavo-convex seat portions in opposite arms thereof, said guide member journalled on said axle shaft and movable therewith in constant spaced relation together with the pulley wheel mounted thereon, said dished seat portions of the bearings adjacent to the complementary dished seat portions of said guide member having unequal longitudinal and lateral meridians to accommodate movement of the seat of the guide member therein, and said bearings being manually adjustable upon releasing said non-rotatable axle shaft to eccentrically displace the axis of the pulley wheel together in spaced relation with the U-shaped guide member bridged thereover.

5. The adjustable pulley mounting as described in claim 2, in which the co-operable means preventing rotation between the bearings and mounting bracket arms comprise radially disposed knurled surfaces on said parts to lock the same in adjusted position.

6. The adjustable pulley mounting as described in claim 4, in which the complementary concavo-convex seat portions on said bearings and said U-shaped pulley guide member have crisscrossed knurled surfaces on the mated faces thereof to lock the same against displacement when in adjusted position.

HOWARD J. FINDLEY.